(No Model.)
C. HOELZEL.
RICE OR GRAIN POUNDER.
No. 420,383. Patented Jan. 28, 1890.
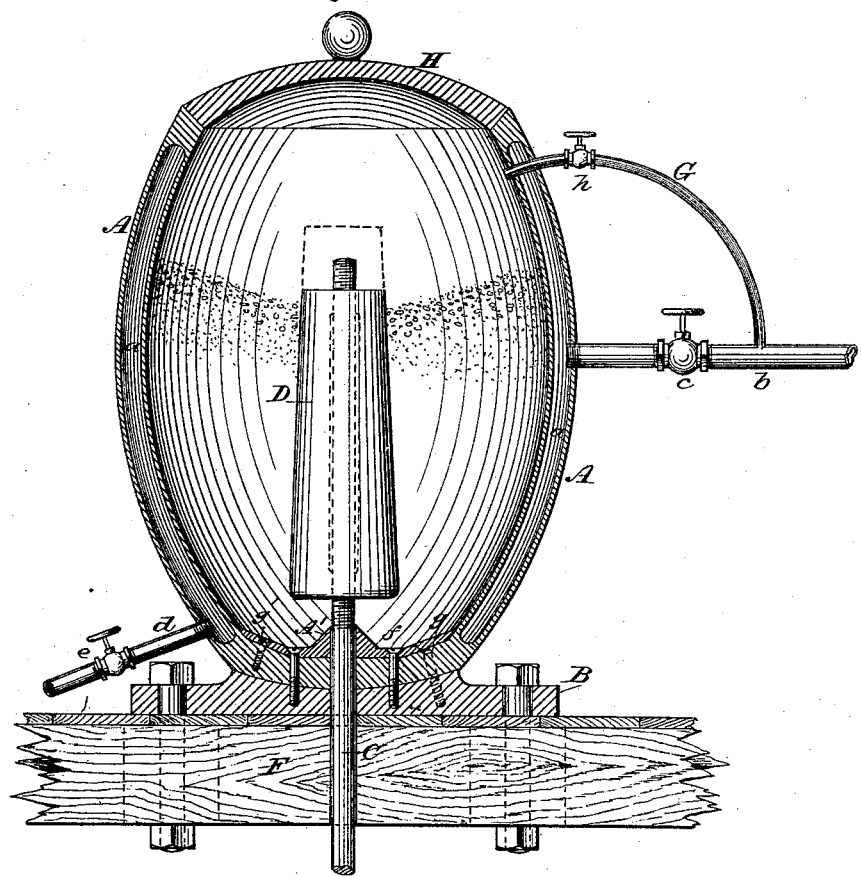
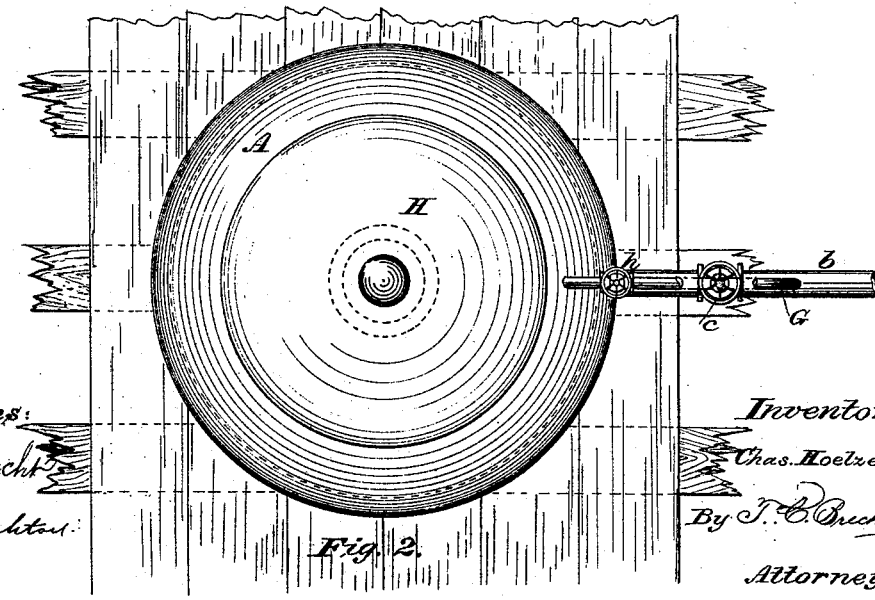
Witnesses:
Inventor:
Chas. Hoelzel,
By T. C. Brecht
Attorney.

UNITED STATES PATENT OFFICE.

CHARLES HOELZEL, OF NEW ORLEANS, LOUISIANA.

RICE OR GRAIN POUNDER.

SPECIFICATION forming part of Letters Patent No. 420,383, dated January 28, 1890.

Application filed January 3, 1889. Serial No. 295,274. (No model.)

*To all whom it may concern:*

Be it known that I, CHARLES HOELZEL, a citizen of the United States, residing at New Orleans, in the parish of Orleans and State of Louisiana, have invented certain new and useful Improvements in Rice or Grain Pounders; and I do hereby declare the following to be a full, clear, and exact description of the invention, such as will enable others skilled in the art to which it appertains to make and use the same.

My invention relates to improvements in pounders for rice and other grains; and the object of the invention is to produce a rice and grain pounder in which said rice or other grain is heated during the operation of pounding it with a pestle, so as to easier loosen as well as expedite the loosening of the skin from the grain or rice.

Another object is to prevent the breaking of the kernels of rice or grain as much as possible, as they are not submitted so long a time to the operation of pounding it as in the ordinary way now in use, and in this case, as is well known, a large quantity of the grain or rice is broken, which is very detrimental to its sale.

My invention, with this object in view, consists in the construction of certain details of a mortar and pounder for rice or grain, and the arrangement of parts, as will be more fully described hereinafter, and specifically pointed out in the claims, reference being had to the accompanying drawings and the letters of reference marked thereon.

Like letters indicate similar parts in the different figures of the drawings, in which—

Figure 1 represents a vertical cross-section of a pounder embodying my invention. Fig. 2 is a top view of the same.

In the drawings, A represents a bowl or mortar made of suitable size and material. It is provided with a space $a$, formed in the double shell of the bowl, and into said space steam or hot air is conveyed by a pipe $b$, provided with a suitable valve or cock $c$ to regulate it. A discharge-pipe $d$, provided with a valve or cock $e$, is arranged to enter the space $a$ near or at the bottom or lower side of the bowl for the escape of condensed water formed by the condensation of the steam. The bowl is provided with a removable lining A' in its bottom, secured to the bowl by screws or bolts $f$, or they may pass into the base B and secure both lining and bowl at one operation. This lining is made of steel or other hard metal, and can be removed when worn out, to be replaced by a new one, which is an important feature of my invention. If desired, the bowl may be secured to the base and the lining separately to the bowl, as indicated by the screws $g\,g'$ in dotted lines, as many as necessary. The base B in turn is securely bolted to a suitable frame or stand F or other foundation. Within the bowl is placed the pestle D, adjustably attached to a strong rod C, passing through the bottom of said bowl and operated from below to rise and fall above six inches by an eccentric, crank, &c. The rice or other grain in the bowl is thus agitated, and by friction is deprived of its skins or other adhering particles and polished. To facilitate and hasten this operation of polishing, &c., steam or hot air is admitted through the pipe $b$, mentioned above, into the space $a$ of the bowl, and by heating it loosens the skins of the kernels. A branch pipe G, having a valve $h$, connects with the pipe $b$ and upper part of the bowl to assist in heating the grain, if desired, and cause it to sweat. In large establishments a series of these mortars and pestles may be connected so as to operate by pulleys and belts driven by line-shafting and an engine or other motive power. A cover H on the bowl A prevents the escape of heat or kernels of rice or other grain.

The steam or hot air from the pipe G is only admitted at certain intervals and in small quantities in case it is found that the grain is too dry, and facilitates the softening and loosening of the shells or hulls of the grain.

The operation is as follows: The mortars and pestles being placed in position and connected to the motive power, the rice or other grain to be cleaned and polished is placed in the mortar and to about three-fourths of its depth. The steam or hot air is then turned on and passes into the space $a$ of the bowl, heats it, and causes the grain to sweat by the heat imparted to it, and softening the thin skins of the kernels they are easily and quickly removed, and thus much time and labor are saved compared to the old process, less kernels of grain are broken, the polishing process is greatly reduced in cost, and the rice or other grain is greatly enhanced in value on the market. The process can be regulated as desired by admitting more or less steam or hot air, and it is a very simple operation, that can be easily applied to any grain-pounders now in use at a very small expense. To increase or decrease the stroke of the pestle it can be adjusted as desired. When the lining is worn out it can be replaced with a new one, and if the bowl should be broken it can also be removed from its base without much inconvenience.

Having thus described my invention, what I claim, and desire to secure by Letters Patent, is—

1. The combination of the bowl A, having a double shell for steam or hot air, the pipe $b$, and valve $c$ for regulating it, with the removable lining A', the pestle D, and the rod C, constructed and arranged to be operated as herein shown and set forth.

2. The combination of a bowl or mortar having a double shell for the introduction of steam or hot air through an inlet-pipe $b$, and an outlet-pipe $d$, with a pestle D, secured to a rod C, and the removable base B, all arranged as described.

In testimony whereof I affix my signature in presence of two witnesses.

CHARLES HOELZEL.

Witnesses:
J. C. WENCK,
CHAS. A. MAURIAN.